(12) United States Patent
Shull

(10) Patent No.: US 7,738,890 B1
(45) Date of Patent: Jun. 15, 2010

(54) DYNAMIC SPECTRUM UTILIZATION TECHNIQUES AND METHODS

(75) Inventor: Eric A. Shull, Oak Ridge, NC (US)

(73) Assignee: Northrop Grumman Systems Corporation, Los Angeles, CA (US)

(*) Notice: Subject to any disclaimer, the term of this patent is extended or adjusted under 35 U.S.C. 154(b) by 553 days.

(21) Appl. No.: 11/746,400

(22) Filed: May 9, 2007

(51) Int. Cl.
*H04Q 7/20* (2006.01)
*H04B 7/00* (2006.01)

(52) U.S. Cl. .................. 455/509; 455/452.1; 455/62; 455/67.13

(58) Field of Classification Search .............. 455/561, 455/456.1, 67.11, 450, 452.1, 509, 63.1, 455/67.13, 62, 69, 226.2; 370/329, 330, 370/343, 280
See application file for complete search history.

(56) References Cited

U.S. PATENT DOCUMENTS

| | | | |
|---|---|---|---|
| 4,009,343 A | 2/1977 | Markey et al. | |
| 4,009,345 A | 2/1977 | Flemming et al. | |
| 4,009,347 A | 2/1977 | Flemming et al. | |
| 5,740,542 A | 4/1998 | Leeper et al. | |
| 6,055,268 A * | 4/2000 | Timm et al. | 375/229 |
| 6,236,365 B1 | 5/2001 | LeBlanc et al. | |
| 6,597,668 B1 * | 7/2003 | Schafer et al. | 370/280 |
| 6,721,282 B2 | 4/2004 | Motley | |
| 6,952,181 B2 | 10/2005 | Karr et al. | |
| 6,982,969 B1 * | 1/2006 | Carneal et al. | 370/329 |
| 2002/0136224 A1 | 9/2002 | Motley | |
| 2003/0222819 A1 | 12/2003 | Karr et al. | |
| 2006/0025158 A1 | 2/2006 | Leblanc et al. | |

OTHER PUBLICATIONS

Dynamic spectrum utilization in ad hoc networks Computer Networks, vol. 46, Issue 5, Jul. 21, 2004, pp. 665-678 V.R. Syrotiuk, M. Cui, S. Ramkumar and C.J. Colbourn.
A DARPA Perspective on Wireless Communications Systems, presentation to AFCEA, Jun. 13-14, 2001 P. Kolodzy.
NeXt generation/dynamic spectrum access/cognitive radio wireless networks: A survey Computer Networks, vol. 50, May 17, 2006 I F Akyildiz, W-Y Lee, M C Vuran, S Mohanty.
Autonomous Dynamic Spectrum Access System Behavior and Performance IEEE, 2005, A Seidel and R Breinig.
Shuffling the Spectrum Deck Signal Magazine, Mar. 2002 H Kenyon http://www.afcea.org/signal/articles/templates/SIGNAL_Article_Template.asp?articleId=432&zoneid=5.
Cogitive Radio Applications to Dynamic Spectrum Allocation IEEE, 2005 D Maldonado, B Le, A Hugine, T Rondeau, C Bostian.

* cited by examiner

*Primary Examiner*—John Lee
(74) *Attorney, Agent, or Firm*—Marsteller & Associates, P.C.

(57) ABSTRACT

A remote communications node unit (86) determines radio frequency (RF) dynamic spectrum utilization for use in a RF communications network (154) and includes a measuring module (46) for measuring radio frequency (RF) interference at a location of the communications node unit (86). A processing module (62) receives RF measurement data from the measuring module (46) for determining RF interference in a local environment of the remote communications node (86) based upon selected factors of the type including mission priority parameters, channel availability statistics, link dynamic information, and the waveform dependent susceptibility data. The processing module (62) controls communications frequency and characteristics used by the remote communications module (86) for exchange of information with other remote communications nodes (86).

21 Claims, 14 Drawing Sheets

DYNAMIC SPECTRUM UTILIZATION TECHNIQUES AND METHODS

BACKGROUND OF THE INVENTION

1. Technical Field

The invention relates to the field of communication systems and particularly to systems for frequency spread bandwidth allocation.

2. Background Art

Many communication systems have ever increasing problems with available spectrum. There are many problems associated with the lack of radio frequency (RF) spectrum. Interference associated with many systems is a significant cause of lack of spectrum bandwidth. The present invention is believed to dramatically improve the spectrum allocation and re-use by using interference detection, discrimination and rating techniques and methods. The techniques go beyond the known frequency policy methods and hardware implementations that have been used in the past as well as those currently being used.

Traditional co-site interference can be described as Radio Frequency (RF) energy present within a set area or facility that causes interference and degradation of communication links and systems. Internal interference sources consist mostly of fundamental RF power, broadband noise, and spurious transmissions originating from co-located transmitters. These transmissions not only interfere with defined communication channels and frequencies, but also degrade and reduce the overall available spectrum that is not used at any particular time.

Traditional co-site solutions consist of complex and unique hardware implementations of antenna directivity, agile RF filtering and combining with other high power techniques, such as interference cancellation phase inversion systems (also known as ICS systems). These solutions are geared toward solving the problems within the platform defined RF channels and frequencies respectively.

RF Interference that does not originate within a given site by design or "as is" can be described as interference that is external or unknown. Sometimes this type of interference can be described as non-directed innocent transmissions or can also be described as directed or hostile transmissions. Intentional jamming is a directed intentional interferer. The dynamic spectrum utilization ("DSU") methods and techniques of the present invention can help differentiate the sources of interferences as described subsequently. The differentiation augments frequency management systems that otherwise may make incorrect decisions on where a communication system may or may not transmit in. Interference blind re-try methods are usually very poor in trying to re-establish a link failure or a link's data performance.

There are many forms of normal RF interference that are not intentionally intended to interfere with communications systems. Typical sources are existing communication systems such as TV and FM transmissions, mobile communication systems such as Cellular systems, municipality transmission systems such as police, fire and rescue, general aviation, and air traffic control radar and guidance. Recently, the family radio service ("FRS") bands are also sources of new external interference. Additionally, government and military systems, as well as other systems, may be causes of interference. These systems are usually well enough defined that they can be discriminated from one another by known signal processing techniques.

Hostile interference can be described as transmissions that are intentionally intended to disrupt, degrade, cause failure or destroy communication systems. These can be categorized into rough transmissions by individuals or tactical jamming systems developed by militaries and nations. The present DSU methods and techniques discriminate these intended transmissions.

Many other sources of interference can be identified. Items such as power-lines, computers and machinery can cause interference. Many of these can be mitigated by standard electronic design practices such as power supply de-coupling, filtering, and mechanical shielding techniques. These will not be extensively referenced herein, but should be similarly addressed by the present invention. The majority of the present DSU methods will describe and discriminate the aforementioned sources of interference as a method to improve the allocation and usage of available spectrum.

All communication links also have range or distance limitations. These are dependent on things such as transmit power, receiver sensitivity, bandwidth, antenna gains and channel coding. When observing and classifying interference on a communications system, it is usually ideal to limit measured interference to emissions that are above the range and Signal to Noise requirements of the system in question. These limitations are used in formulating smart thresholds when rating available spectrum for a given communication link and its corresponding present range.

For example, in an end to end mobile communication system, as the pair gets closer to each other, the sensitivity requirements of each receiver unit or end gets easier to understand. By dynamically adjusting the availability threshold level when classifying whether a channel is available or not allows one to classify not only the sensitivity requirements of the receiver, but that of the transmitter as well. The ratings are based on the time—distance relationship of the link which better serve frequency allocation sub-systems decision processes.

Terrain limitations on communications links are usually defined as an obstruction such as a building, mountain or vegetation such as a forest. This limitation can be addressed with GPS coordinated mapping techniques and augmented by a number of methods such as ground or airborne relay sub-systems. Link failures in these cases are not attributed to available spectrum, but to physical terrain.

While the above cited references introduce and disclose a number of noteworthy advances and technological improvements within the art, none completely fulfills the specific objectives achieved by this invention.

DISCLOSURE OF INVENTION

In accordance with the present invention, a remote communications node unit determines radio frequency (RF) dynamic spectrum utilization for use in a RF communications network and includes a measuring module for measuring radio frequency (RF) interference at a location of the communications node unit. A processing module receives RF measurement data from the measuring module for determining RF interference in a local environment of the remote communications node based upon selected factors of the type including mission priority parameters, channel availability statistics, link dynamic information, and the waveform dependent susceptibility data. The processing module controls communications frequency and characteristics used by the remote communications module for exchange of information with other remote communications nodes.

These and other objects, advantages and preferred features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

MODE(S) FOR CARRYING OUT THE INVENTION

Figure 1:
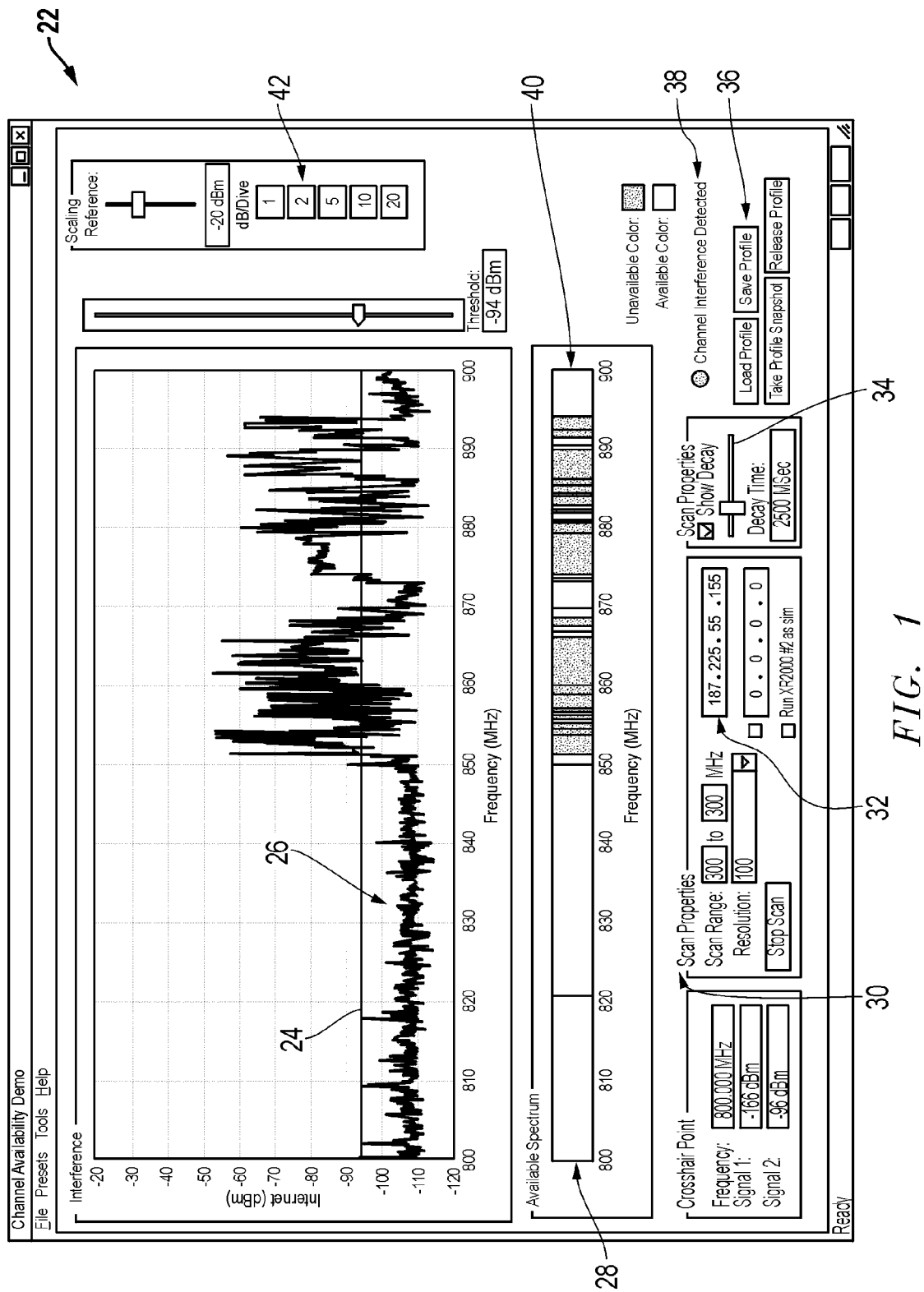
FIG. 1 is an illustration of a computer screenshot showing a local dynamic spectrum utilization ("DSU") application running software showing initial channel ratings.

So that the manner in which the above recited features, advantages and objects of the present invention are attained can be understood in detail, more particular description of the invention, briefly summarized above, may be had by reference to the embodiment thereof that is illustrated in the appended drawings. In all the drawings, identical numbers represent the same elements.

A remote communications node unit 86 determines radio frequency (RF) dynamic spectrum utilization for use in a RF communications network 154 and includes a measuring module 46 for measuring radio frequency (RF) interference at a location of the communications node unit 86. A processing module 62 receives RF measurement data from the measuring module 46 for determining RF interference in a local environment of the remote communications node 86 based upon selected factors of the type including mission priority parameters, channel availability statistics, link dynamic information, and the waveform dependent susceptibility data. The processing module 62 controls communications frequency and characteristics used by the remote communications module 86 for exchange of information with other remote communications nodes 86

Dynamic Spectrum Utilization ("DSU") encompasses multiple methods and techniques to determine best radio frequency (RF) allocations on communication sub-systems frequency channels and blocks of channels. Knowing where transmit assets are located, what type of self-interference they generate, when they are transmitting in time, and what type of signals these are, channel and block channel ratings can be determined and classified by analysis, measurements and signal processing. These rating classifications are then forwarded to a back processing network entity over a known type of wireless network protocol transmitter or transceiver as an augmentation on top of frequency channel allocations and policies. Additional benefits of these ratings and processing methods is the determination channel failure or probable failures.

a. DSU Local Application

FIG. 1 shows a remote or local DSU application 22 running software that shows how initial channel ratings are performed. Threshold level 24 is shown above the signal measurement plot 26. Real time channel availability gauge 40 is shown below the signal graph. A corresponding green color may be used to indicate an available channel, and red to indicate an unavailable channel, for example. A local link window 28 is the present radio link that is being monitored. A threshold decay parameter slider 34 determines the amount of time it takes to adjust pre-measured measurements to the minimum value. Set-up parameters 30, 32, 36 and 42 are for scan range 30, Internet Protocol (IP) address of local DSU node 86, threshold type 36 and display scaling respectively 42.

b. Micro and Macro Level DSU Operations

Figure 2:
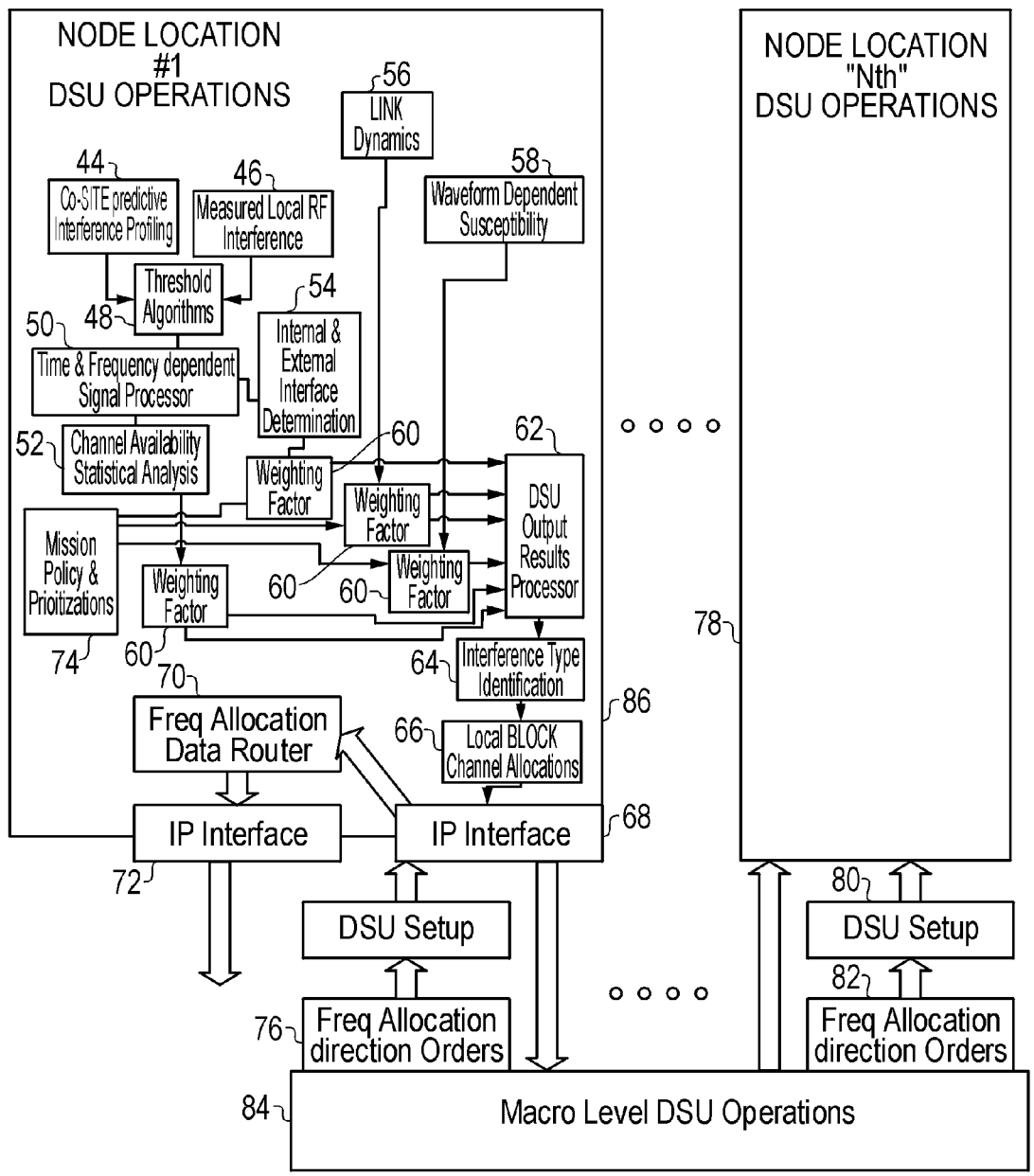
FIG. 2 is a flow chart depicting the micro and macro level of operations the present invention performs and data flows.
Figure 14:
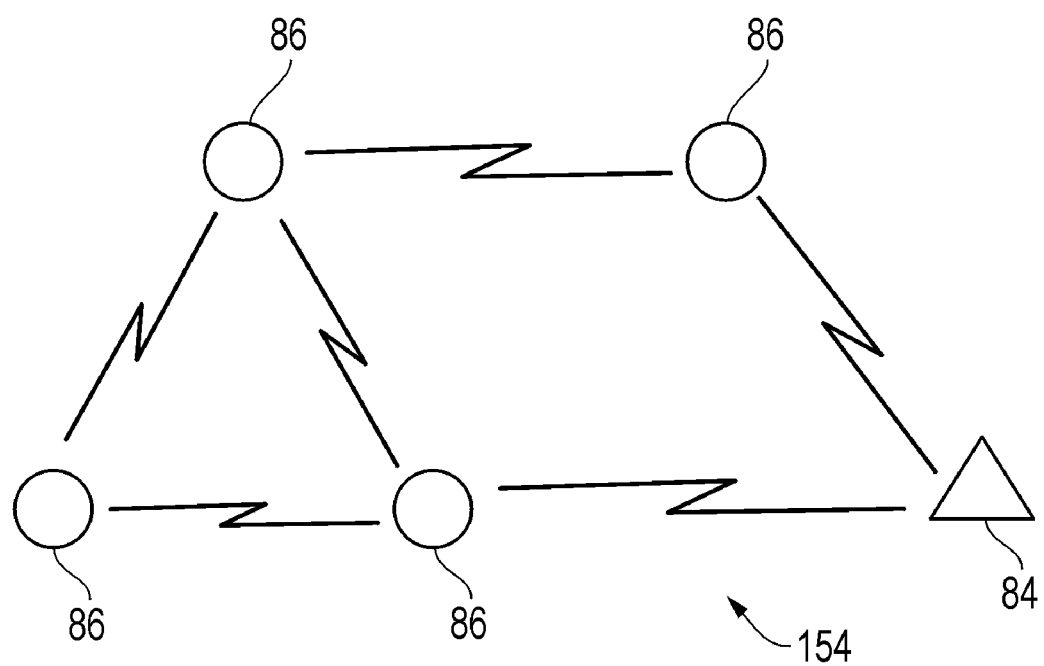
FIG. 14 depicts a RF communications network including geographically separated, discrete remote nodes of the present invention.

FIG. 2 shows the micro (remote node operational level) and macro (network operational) or higher level of operations the DSU performs and how the data flows back to a network entity 84 from local or "remote" Node#1 86 up to an "Nth" local node 78. There is no limit to the number of separate local DSU operations or nodes 86. FIG. 14 depicts a typical wireless, RF communications network or topology 154 with geographically separated, discrete remote node units 86 communicating between themselves and with the network entity 84.

The network entity that performs macro level operations 84 also sets up each local DSU parameters 80. The higher level network entity 84 also directs each radio within a local node on what frequency allocations 76 they shall transmit and receive on. At each local node, local RF energy is measured 46 using a known Fast-Fourier-Transform technique within a digital receiver with signal processor 46 and data is sent to the threshold process block 48. Co-site prediction interference data 44 are also fed to the threshold process 48. Within the threshold process block 48 determination is made on which type of threshold should be used and how many are used. This data is sent to the time and frequency signal processing block 50 that determines decay parameters and block sizes. The output of this process is sent to both the channel availability statistics first pass block 52 and the interference internal-external determination type process 54. The output of the internal-external determination process is multiplied by a weighting factor 60 and sent to the DSU output results process 62.

The DSU output process also receives weighted data 60 from mission priority parameters 74, channel availability statistics 52, link dynamic information 56, and the waveform dependent susceptibility data 58 processes or processing modules. Collectively the DSU output results process or module 62 determines the interference type identification 64 and local channel block frequency allocations information 66. The channel block allocation ratings are then sent out over the IP interface of a known type of wireless network protocol transmitter or transceiver 68 to the network entity 84. The data information may also be conveyed to a frequency allocation data router module 70 that conveys the information signals to another IP interface module 72 that can communicate the information as desired to other functions within the local node 86 or other devices or systems (not shown).

The network entity 84 determines best allocation for the end-end link by looking at the channel block allocation ratings at the other end of the link at an "nth" location 78. Upon determining the allocations, the network entity determines whether or not to make a spectrum frequency allocation change order.

c. Typical Hardware Implementation

Figure 3:
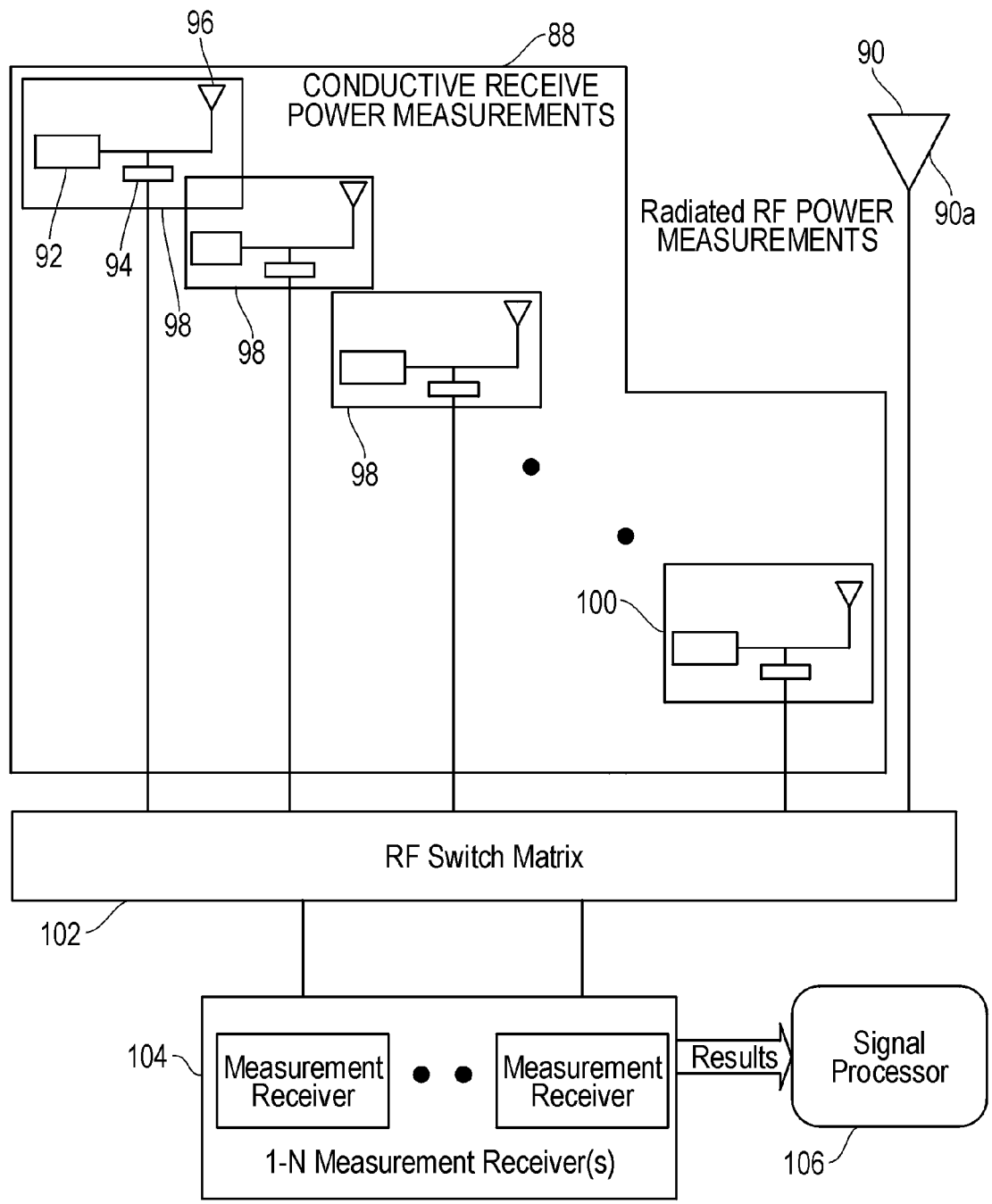
FIG. 3 is a schematic illustration of a DSU local implementation of conducted and radiated measurements.

FIG. 3 shows an illustration of a typical hardware implementation of measuring RF conductive 88 and radiated 90 interference at a single remote node location. For a co-located radio 92 within each radio system 98 up to the nth radio system 100 within a given location, each incoming interference measurement is done conductively through directional couplers 94. For each location the interference is also measured from a radiated perspective using an antenna 90a.

A correlation between external and internal interference is performed to help determine if the interference is expected, if it conducted or not, radiated, internal or external. An RF switch matrix 102 may be used to minimize the number of measurement receivers needed 104. The measurement receiver may consist of a fast tunable radio receiver with digital signal processor 106. To the maximum limit this receiver could be one of up to the nth receiver. If this receiver goes to nth receiver for example, the RF switch matrix 102 may not be necessary.

DSU Methods and Techniques a. Variable Channel Availability Block Interference Ratings Definitions and Purposes Channel availability blocks 108, 114 are defined as interference regions in the frequency space and time space. For each respective type of communication system an ideal availability block exists. These blocks can then be rated across the available spectrum in terms of interference percentages and then rated across the available spectrum of use for each signal type.

Figure 4:
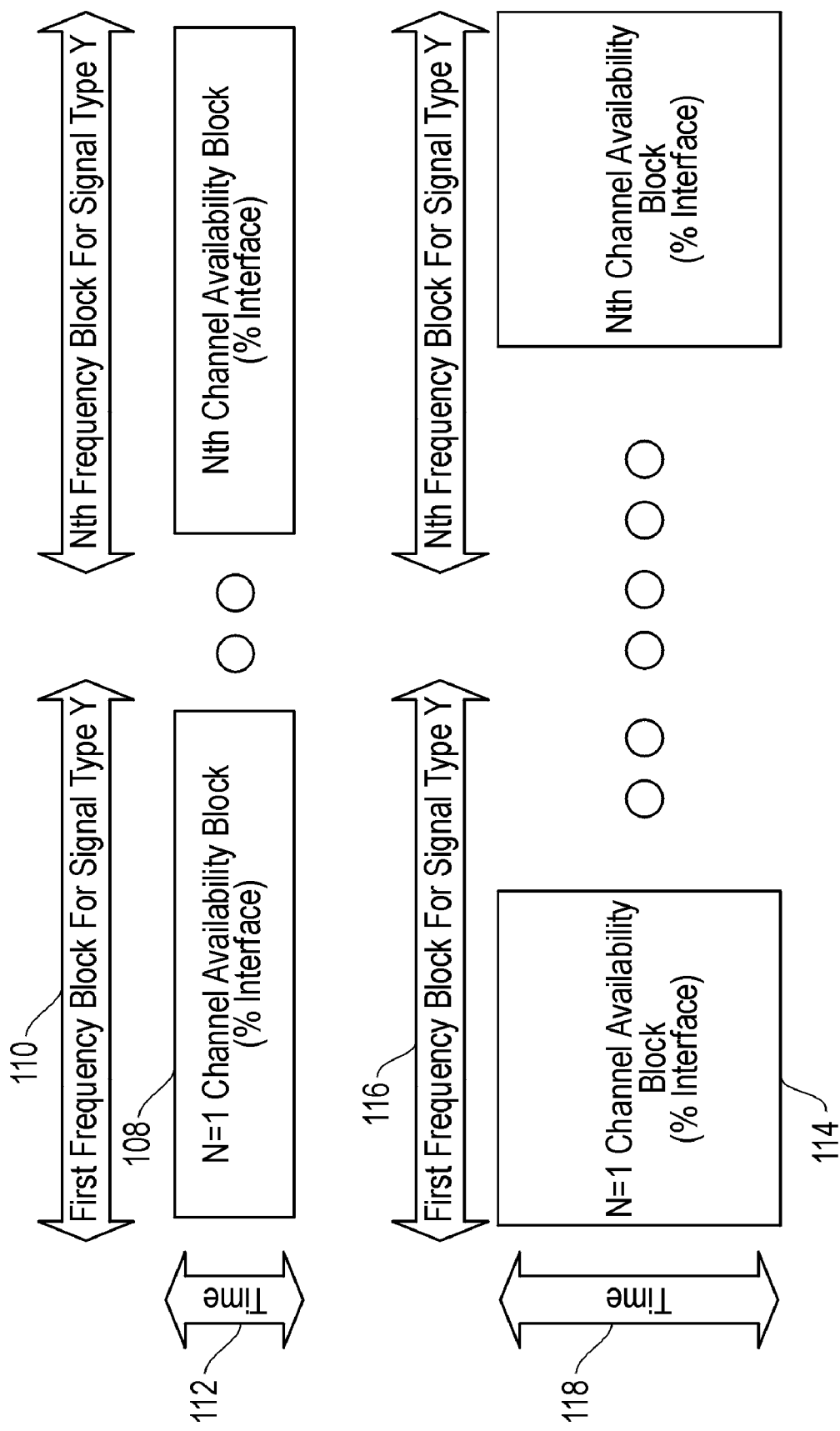
FIG. 4 is another schematic illustration showing frequency and time integration relationships for the present invention.

FIG. 4 demonstrates frequency 110, 116 and time 112, 118 integration relationships.

For each signal type, a range of available frequencies is identified. Usually, but not always, this is defined across successive frequencies. The overall block range may be defined as BR=N*(frequency block width). This range is identified for each separate set of communication signal types where each block is not necessarily the same width and each block range may or may not be the same size.

Across unique block ranges, spectrum is measured using unique thresholds within blocks and given subsequent channel interference percentages (Ps). Each percentage block is then compared across each block range and given a rating from 1 to N, for example. Where rating 1 is set equal to the best available channel, and rating N would equal the worst channel or most interference. These ratings may then be compared across each end of the communication link. Once compared, the network management entities macro DSU operations 84 has an interference rating across the spectrum 124 for each link at its respective frame rate 112, 118. This data is used to determine the best channel to change to from an interference perspective.

Next, for each availability block, the type of interference is quantified as internal, external non-intended, external intended, noisy, non-noisy, burst, continuous wave, info-modulated, or unknown. The determination of the type of interference is used to determine the quality affect upon the link based on whether the waveform coding and other parameters make it more or less robust. Weighting factors 60 are applied at each block and new ratings are given. With this quantification, frequency change orders to each end of the communication channel are then be done with a higher probability of success.

Figure 5:
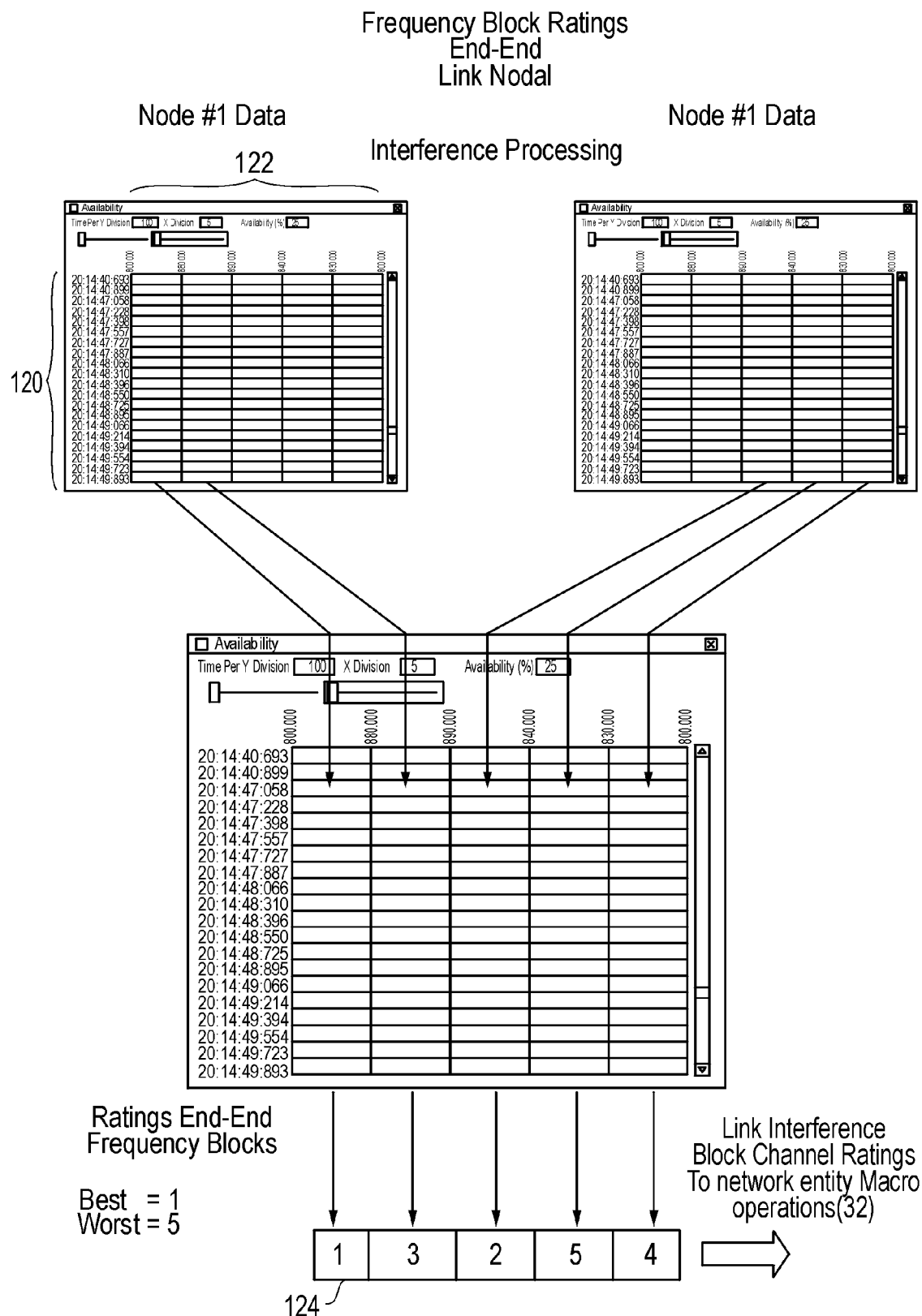
FIG. 5 is a schematic illustration showing the rating of end-end channel blocks.

FIG. 5 exemplifies an end-end interference rating process over multiple blocks 122 and over multiple time frames 120.

b. Channel Block Availability Threshold Definitions and Purposes

Figure 6A:
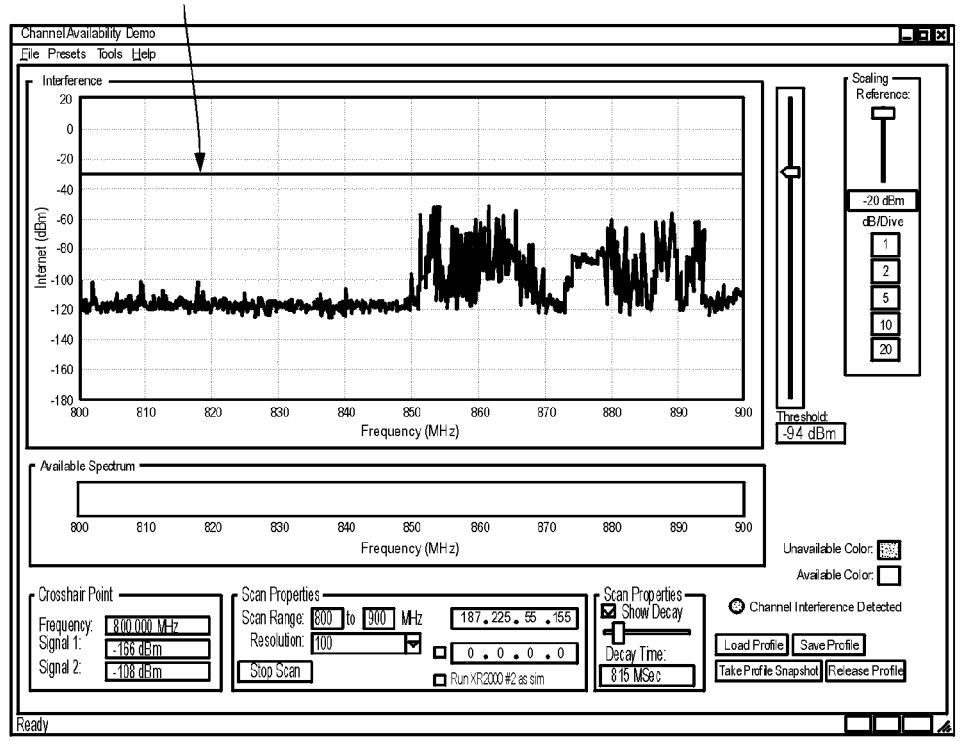
FIG. 6 is a series of two computer screenshots depicting linear threshold with different offsets according to the present invention.
Figure 6B:
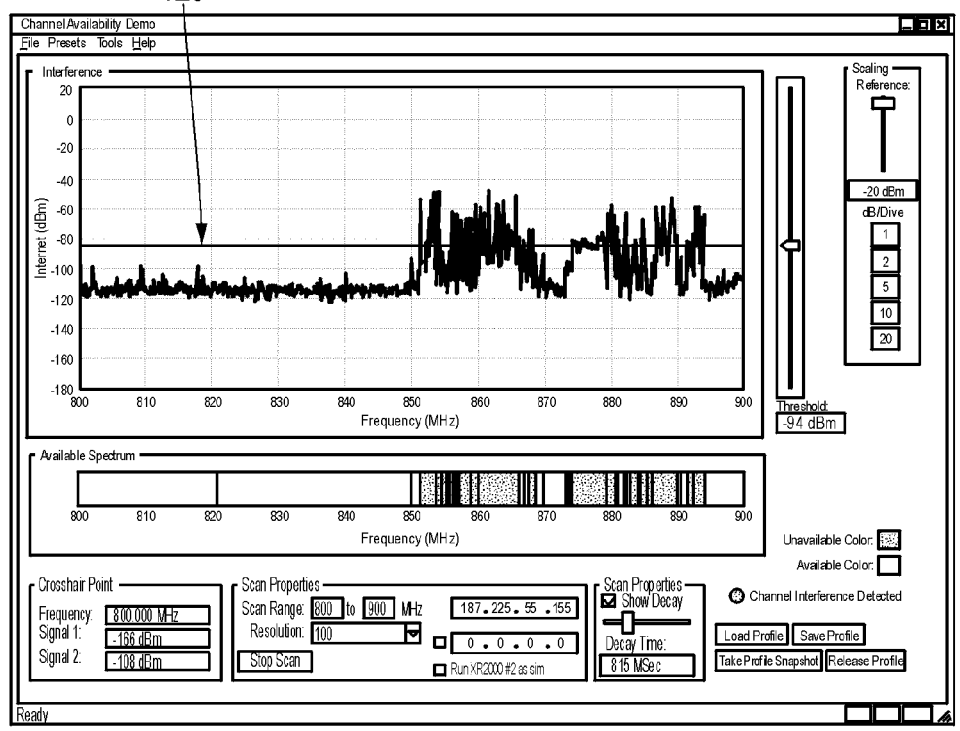
Figure 7A:
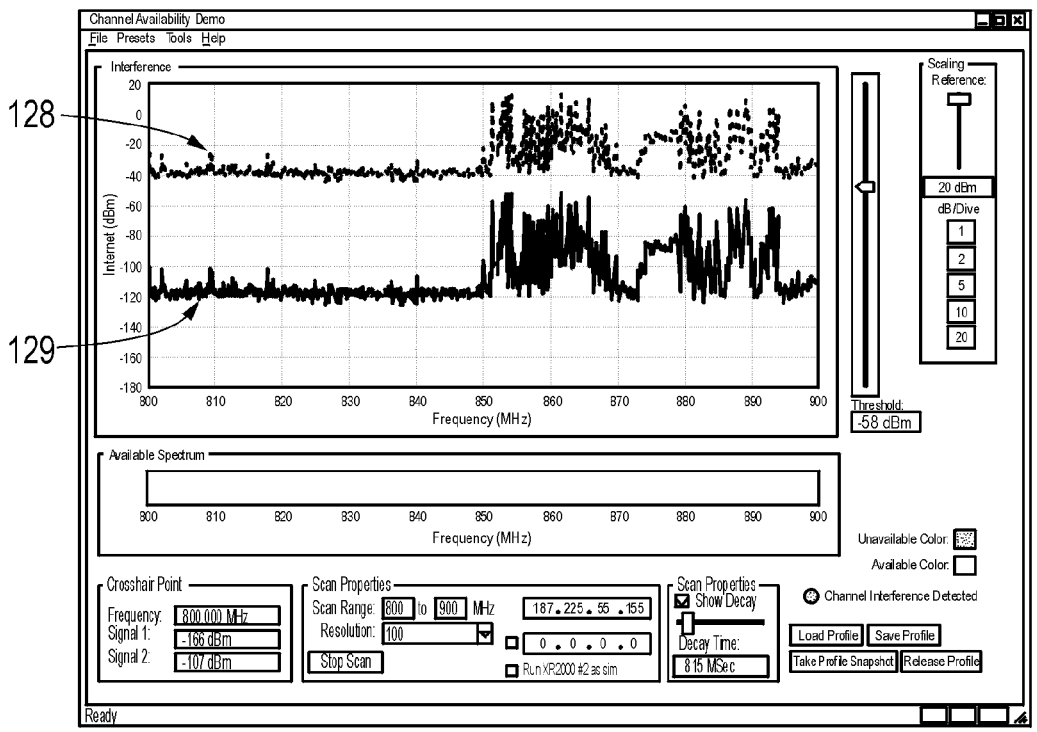
FIG. 7 is a series of two computer screenshots depicting a channel available threshold according to the present invention.
Figure 7B:
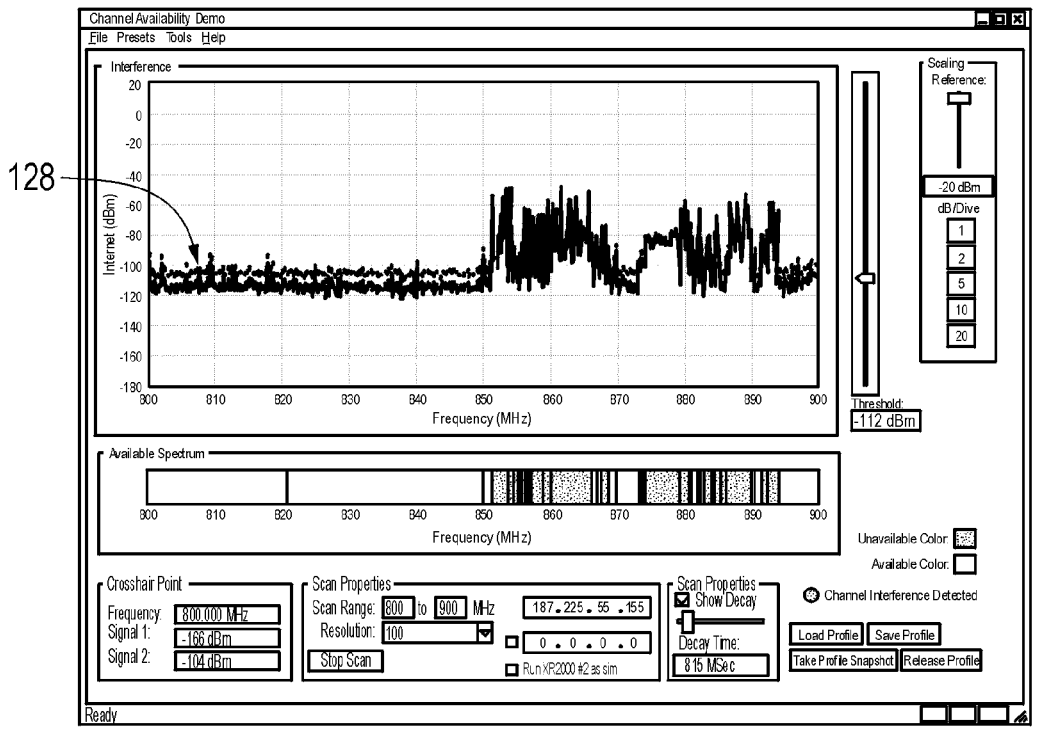
Figure 8A:
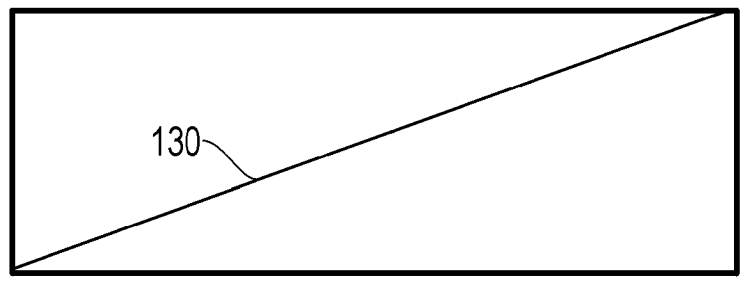
FIG. 8 is a series of graphs or plots depicting functional threshold types.
Figure 8B:
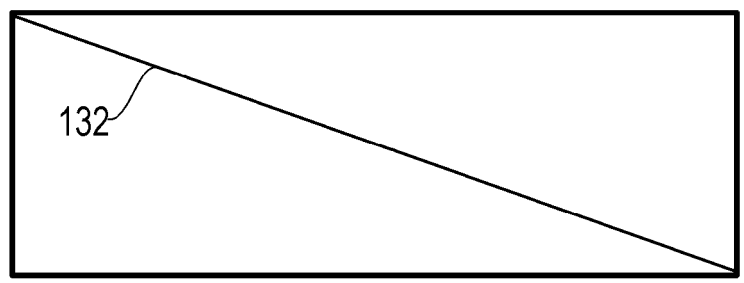
Figure 8C:
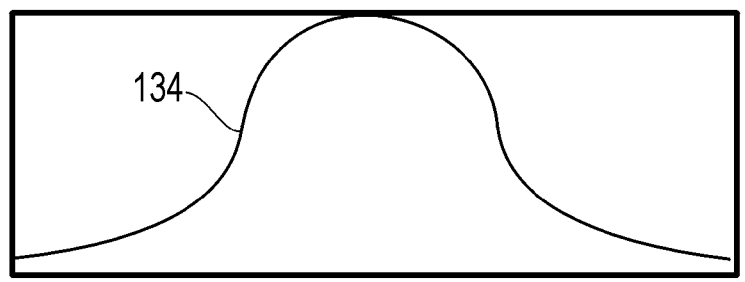
Figure 8D:
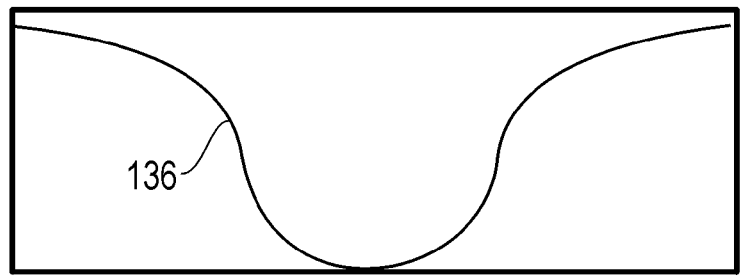

Referring particularly to the depictions of FIGS. 6 and 7, in order to properly rate each channel block, several threshold techniques should be applied across each frequency block for maximum rating accuracy. The threshold types are defined as the following:

1. Threshold 1: Linear or offset 126 (shown in the series of illustrations of FIG. 6).

A linear threshold is simply a signal level where interference is determined to be present if it is above or below this threshold value. Typically this is set to the sensitivity and signal to noise ("S/N") requirements of the link and can be adjusted depending upon the link range requirements and dynamics such as the end-end radios getting closer or further apart. This type of threshold is the simplest to conceptualize.

See FIG. 6 for linear threshold with two different offsets. FIG. 6a depicts a linear threshold for channel availability with the threshold well above the signals and FIG. 6a shows the linear threshold with an offset reduced below the signals.

2. Threshold 2: Snapshot or Historical 128 (Shown in the Series of Illustrations of FIG. 7).

A snapshot or historical threshold is determined by a previous time sample or average of multiple samples of the interference energy across the measurement band. The signal of interest is compared across a single block or the frequency block range BR at each resolution bin with each bin value of the snapshot threshold.

FIG. 7 shows snapshot threshold with two different linear offsets. FIG. 7a depicts a historical or snapshot threshold for channel availability with the channel available and with a linear offset and FIG. 7a shows the historical or snapshot threshold with an offset reduced.

FIG. 7a also shows a plot depicting a measured and integrated actual RF signal of interest 129.

3. Threshold 3: Functional such as Ramp-Up 130, Ramp-Down 132, Bump 134, or Dip 136 (Shown in the Series of Illustrations of FIG. 8).

A functional threshold can be used to determine skew of the interference and whether or not it is noisy interference or non-noisy interference. If the integrated interference power across a ramp up threshold 130 is equal to ramp down threshold 132 and the bump threshold 134 is equal to the dip threshold 136, the probability that the interference type is noisy is high. Since noise has equal distribution, the integrated power across these thresholds should be symmetrical. This is a fast and effective way to classify the interference.

4. Threshold 4: Exemplary Co-Site Interference Profile form 138 (Shown in the Depiction of FIG. 9).

A co-site interference profile threshold may be a set of expected interferences values across the intended measurement ranges that are known to exist at a given time within a local communication node 86. The profile is generated from analysis tools such as a computer program as depicted on the computer screen-shot 142 with inputted or shared parameters 141 of FIG. 9 and laboratory measurements of knowing when co-located transmitters are on or off at a given time, and how much power, harmonics, spurious and inter-modulation signals they generate within the local node 86.

Figure 9:
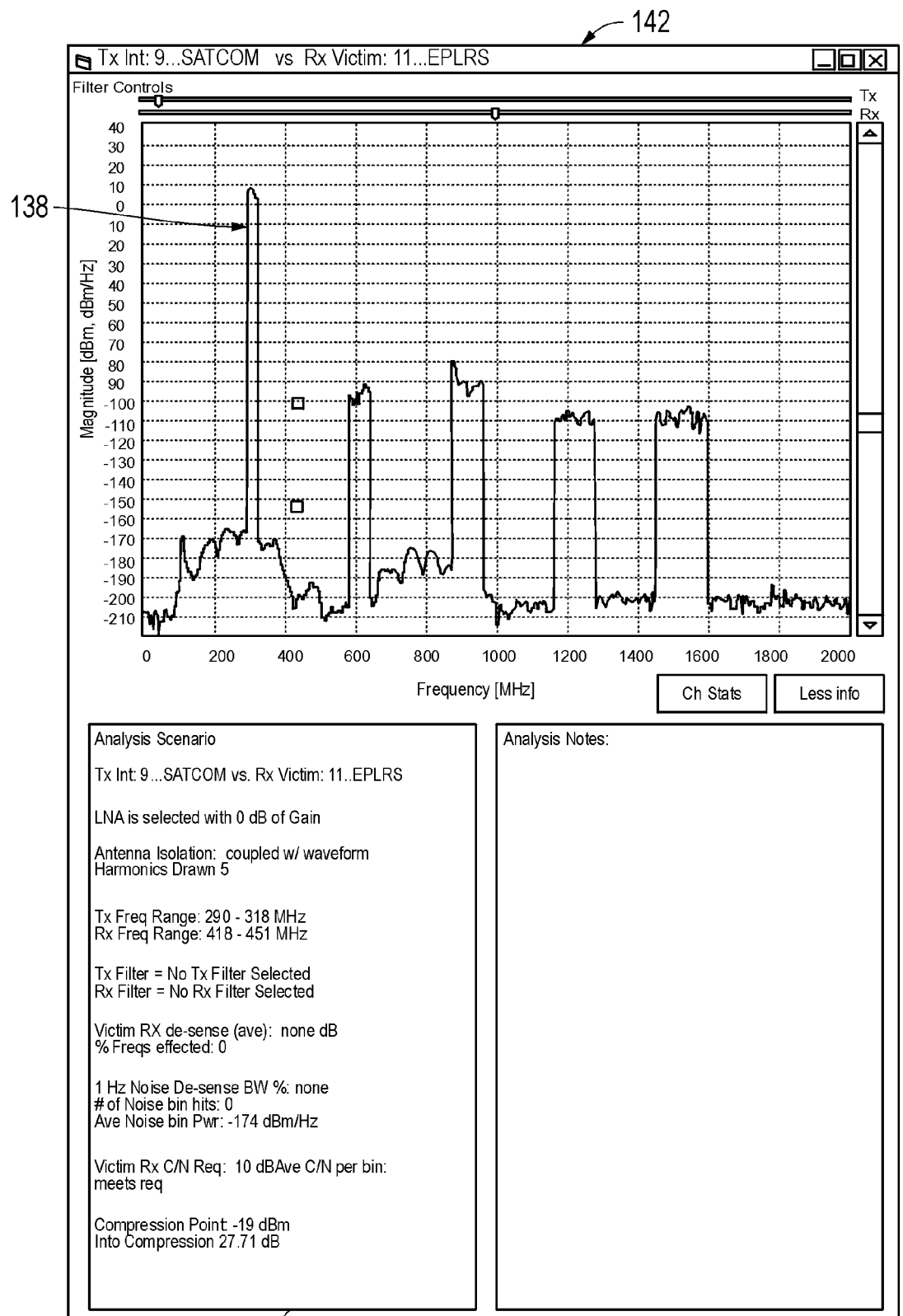
FIG. 9 is an illustration of a computer screenshot showing an exemplary co-site interference profile as calculated.

FIG. 9 shows an exemplar of a composite threshold generated by a computer aided analysis tool 142 that calculates out these spurious, harmonic and noise products.

5. Threshold 5: Composite 140 (Shown in the Series of Illustrations of FIG. 10).

Figure 10A:
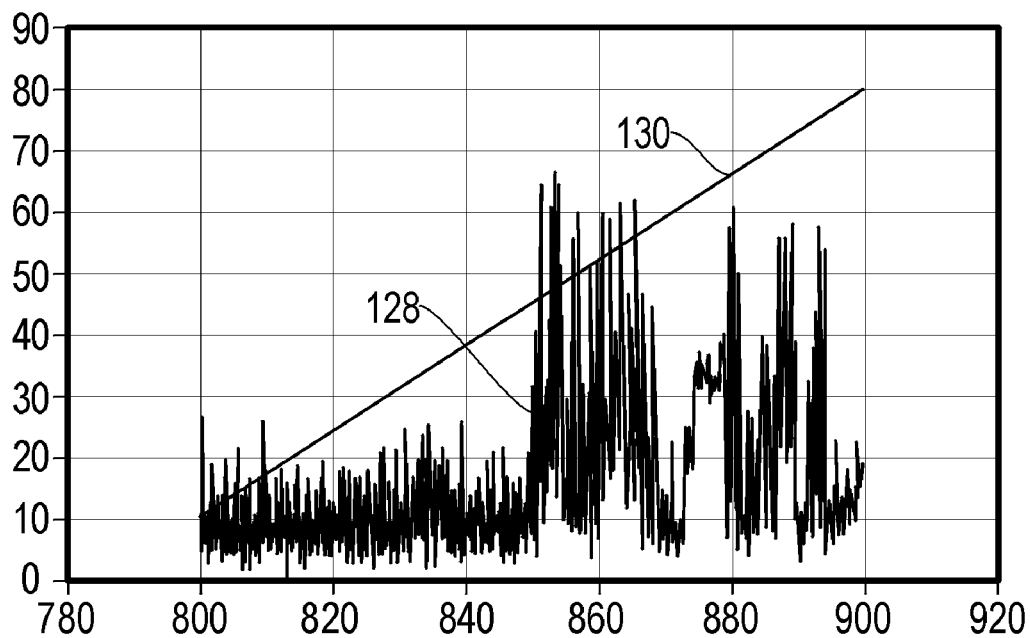
FIG. 10 is series of graphs or plots depicting composition of a composite threshold according to the present invention.
Figure 10B:
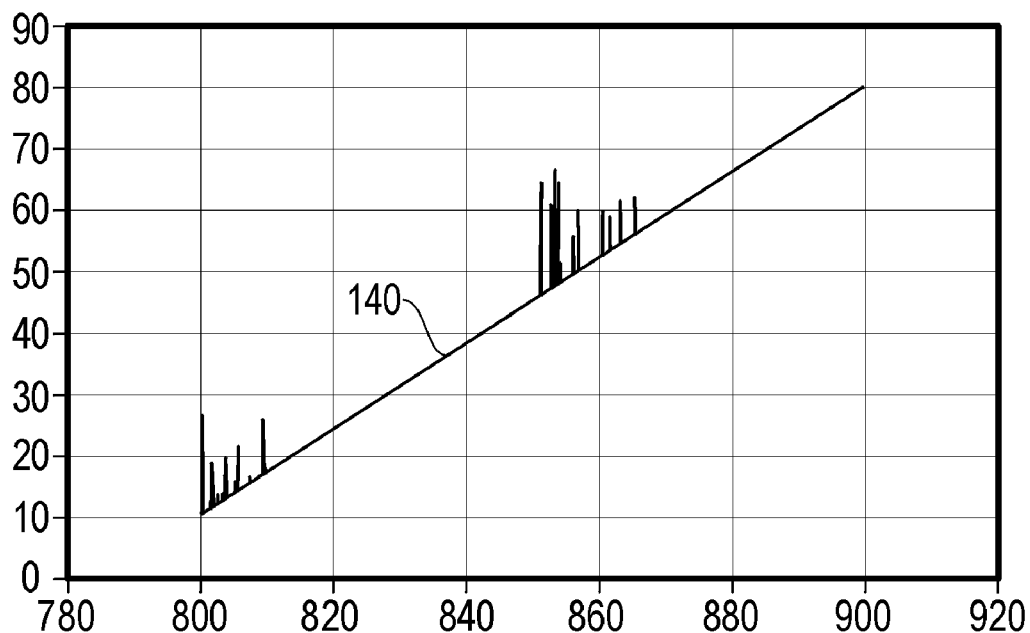

Composite thresholds 140 can be calculated based on arithmetic or logical composites of any of the previously defined thresholds 126, 128, 130, 132, 134, 136, or 138 by way of example. In FIG. 10 the composite threshold 140 shown in FIG. 10b is comprised of the maximum of the linear ramp-up threshold 130 to that of a snapshot threshold 128.

c. Peak Hold and Decay Decision Based Processing

Measuring interference at the local node 86 level, signals often tend to be quite variable in amplitude. This variation could be a result of many factors such as modulation of the signal, movement of the local node, blockage from another moving structure, or changes in weather such as rain, hail or snow. To minimize the amount of variability in the signal amplitude so as to not report wide swings in channel availabilities, the present DSU may use peak hold and slow decay techniques that reduce this variability.

Figure 11:
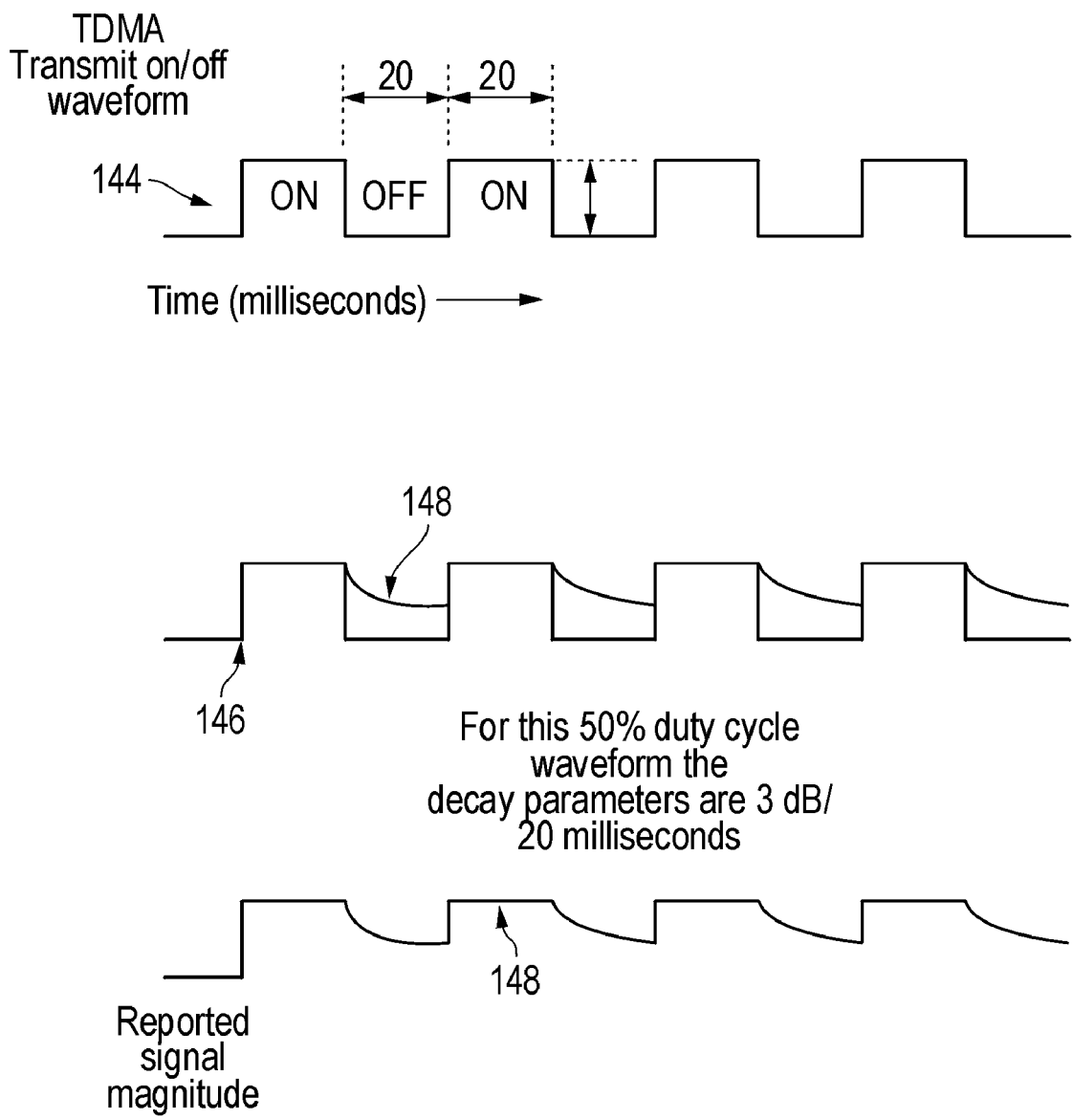
FIG. 11 is series of graphs or plots depicting peak decay processing.

The variability reduction may generally be based on the type of end to end radio link that the DSU system is trying to analyze. For example, a known TDMA type signal structure 144 may transmit for 20 milliseconds and then receive for another 20 milliseconds. The duty cycle would be 50% in this case. For this type of modulation, it may not make sense to have a zero decay of the signal. If done that way, the channel availability ratings would vary from 0% to 100% depending on the sample timing. The decay slope 148 in the example shown in FIG. 11 is set to 3 dB or 50% of the peak power 20 milliseconds later. The reported channel availability upon the decayed signal magnitude 148 in this case would be 0% to 50%. If the decay parameters were set to 0 dB across the first 20 milliseconds and then start to decay, the reported channel availability would go to 0% regardless of when the signal was sampled.

The variability of the reported channel ratings would be reduced significantly and, as such, less data would need to be sent back to the network entity macro DSU operations 84.

Figure 12:
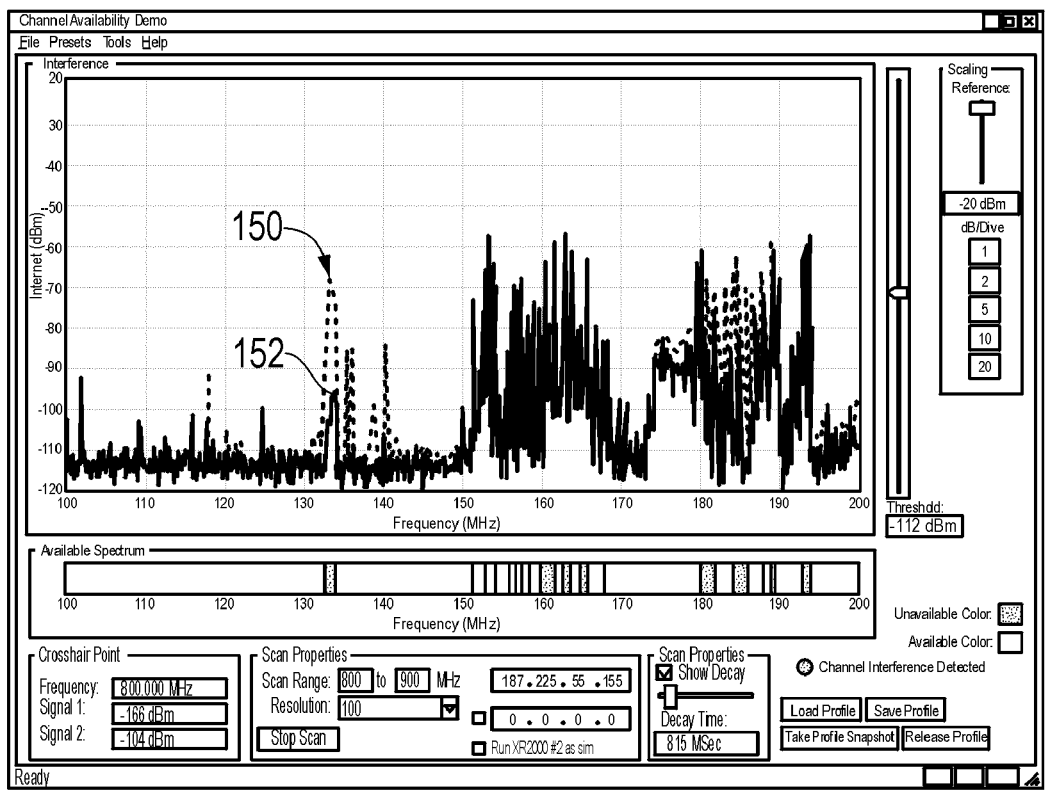
FIG. 12 is an illustration of a computer screenshot showing an exemplary implementation of a peak and hold decay process according to the present invention.

In FIG. 12 is an example where this process shows as being implemented on a known type of GSM cellular signal with ⅛ duty cycle. In the central plot of FIG. 12, peak hold 150 is shown prior to the decay, and an instantaneous measurement 152 is used to determine availability.

In the event that two nodes 86 can not communicate with one another, then the DSU system of the present invention would likely be off.

The initial scan would be accomplished after the remote node 86 was given parameters from the network administration 84 such as RF start, stop, resolution, and state time as described above.

Figure 13:
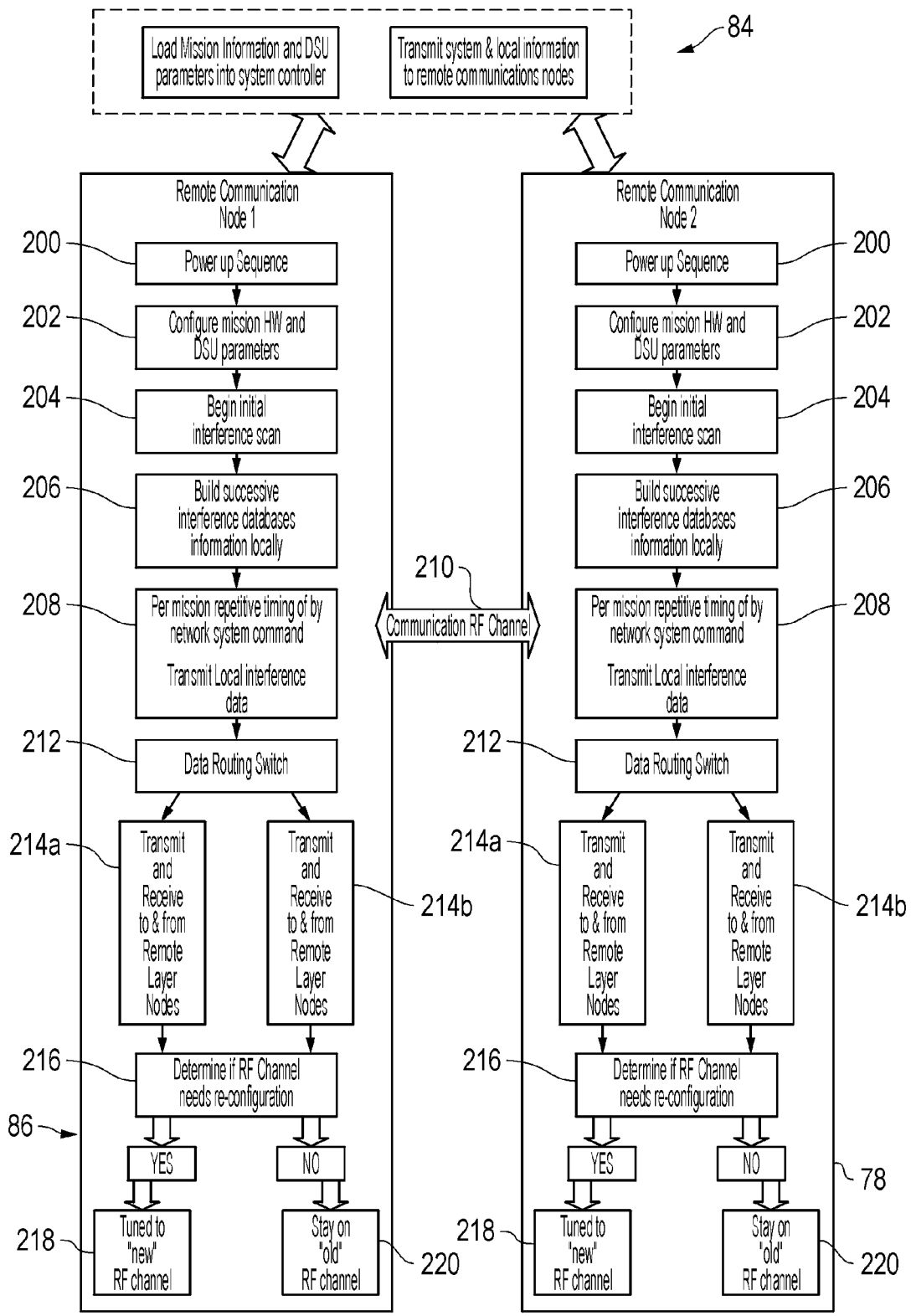
FIG. 13 is a flowchart of operation for the present invention.

FIG. 13 depicts a flowchart for operation of the present invention. Generally a sequence of preferred steps for each node unit 86 would include:

a. a power-up sequence (block 200);
b. the mission hardware and DSU parameters would be configured (block 202);
c. an initial interference scan would begin (block 204);
d. the information for successive interference databases would be built (block 206);
e. the repetitive timing for the programmed mission or a network system command would cause the transmission 210 of the local interference data from one node unit 86 to one or more other node units in the local environment or network 154 (block 208);
f. the information is then passed to the data routing switch 70 (block 212) to determine whether the data is to be passed back to the main network entity 84 (shown by the dotted lines in FIG. 13) as well as other nodes 86 (The determination to switch to a "better" channel may optionally be determined at the local note 86 level or at the network entity layer or level 84 as determined by the DSU set-up parameters.);
g. one or more transceivers transmit and receive the data to and from other remote layer nodes 86 (blocks 214a and 214b);
h. the data is then conveyed to a processing module that determines whether the RF channel being used by the node 86 need to be re-configured (block 216); and,
i. if the determination is made that the channel needs to be re-configured, then the remote node is tuned to a new RF channel (block 218) and the information is passed directly to the other nodes in the network or to the network entity 84, otherwise, the remote node 86 remains on the RF channel then being used (block 220).

The foregoing disclosure and description of the invention are illustrative and explanatory thereof, and various changes in the size, shape and materials, as well as in the details of the illustrated construction may be made without departing from the spirit of the invention.

The invention claimed is:

1. A remote communications node unit determining radio frequency (RF) dynamic spectrum utilization for use in a RF communications network comprising:

a measuring module for measuring radio frequency (RF) interference at a location of the remote communications node unit;

a processing module receiving RF measurement data from the measuring module for determining RF interference in a local environment of the remote communications node based upon selected factors of type including mission priority parameters, channel availability statistics, link dynamic information, and waveform dependent susceptibility data; the processing module controlling communications frequency and characteristics used by the remote communications module for exchange of information with other remote communications nodes.

2. The invention of claim 1 further including a network entity processor for transmitting system and local information to one or more remote communications nodes.

3. The invention of claim 1 wherein the measuring module further includes at least one receiving subsystem for measuring conductive interference at a location of the remote node.

4. The invention of claim 1 wherein the measuring module further includes at least one receiving subsystem for measuring radiated interference at a location of the remote node.

5. The invention of claim 1 wherein the remote communications node includes a wireless network transceiver for communicating RF signals with other members of a network.

6. The invention of claim 1 wherein the processing module determines ranges of RF frequencies to be used for communications and determines a type of interference within a local environment for the ranges of RF frequencies to calculate an optimal RF frequency range to be used for communications within the RF communications network.

7. A radio frequency (RF) communications network of type including a plurality of discrete remote node units that intercommunicate in a geographically dispersed network comprising:
 a plurality of remote communications node unit determining radio frequency (RF) dynamic spectrum utilization for use in the RF communications network comprising:
  a measuring module for measuring radio frequency (RF) interference at a location of a communications node unit;
  a processing module receiving RF measurement data from the measuring module for determining RF interference in a local environment of the remote communications node based upon selected factors of the type including mission priority parameters, channel availability statistics, link, dynamic information, and waveform dependent susceptibility data; the processing module controlling communications frequency and characteristics used by the remote communications module for exchange of information with other remote communications nodes.

8. The invention of claim 7 further including a network entity processor for transmitting system and local information to one or more remote communications nodes.

9. The invention of claim 7 wherein the measuring module further includes at least one receiving subsystem for measuring conductive interference at a location of the remote node.

10. The invention of claim 7 wherein the measuring module further includes at least one receiving subsystem for measuring radiated interference at a location of the remote node.

11. The invention of claim 7 wherein the remote communications node includes a wireless network transceiver for communicating RF signals with other members of a network.

12. The invention of claim 7 wherein the processing module determines ranges of RF frequencies to be used for communications and determines a type of interference within a local environment for the ranges of RF frequencies to calculate an optimal RF frequency range to be used for communications within the RF communications network.

13. A method for radio frequency (RF) communication between a plurality of discrete remote node units in an RF communications network including the steps of
 configuring mission hardware and dynamic spectrum utilization (DSU) parameters;
 performing an initial interference scan using a measuring module;
 building information for successive interference databases with collected interference data;
 communicating the collected interference data with other remote nodes;
 conveying the data to a processing module for determining whether a RF channel being used by the discrete remote node requires re-configuration; and,
 re-configuring an operational RF channel if network communications can be improved.

14. The method of claim 13 further including a network entity processor for transmitting, system and local information to one or more remote communications nodes.

15. The method of claim 13 wherein the measuring module further includes at least one receiving subsystem for measuring conductive interference at a location of the remote node.

16. The method of claim 13 wherein the measuring module further includes at least one receiving subsystem for measuring radiated interference at a location of the remote node.

17. The method of claim 13 wherein the remote communications node includes a wireless network transceiver for communicating RF signals with other members of a network.

18. The method of claim 13 wherein the processing module determines ranges of RF frequencies to be used for communications and determines a type of interference within a local environment for the ranges of RF frequencies to calculate an optimal RF frequency range to be used for communications within the RF communications network.

19. The method of claim 13 wherein the processing module determines ranges of RF frequencies to be used for communications and determines a type of interference within a local environment for the ranges of RF frequencies to determine a best modulation waveform for that previously quantified type of interference.

20. The method of claim 13 wherein the processing module determines ranges of RF frequencies to be used for communications and determines a type of interference within a local environment for the ranges of RF frequencies to determine best communications channel coding techniques for that previously quantified type of interference.

21. The method of claim 13 wherein the processing module determines ranges of RF frequencies to be used for communications and determines a type of interference within a local environment for the ranges of RF frequencies to determine best interleaving and redundancy for that previously quantified type of interference.

* * * * *